March 6, 1945.　　　A. DABRASKY　　　2,370,639
VEHICLE
Filed Sept. 9, 1941　　　5 Sheets-Sheet 5
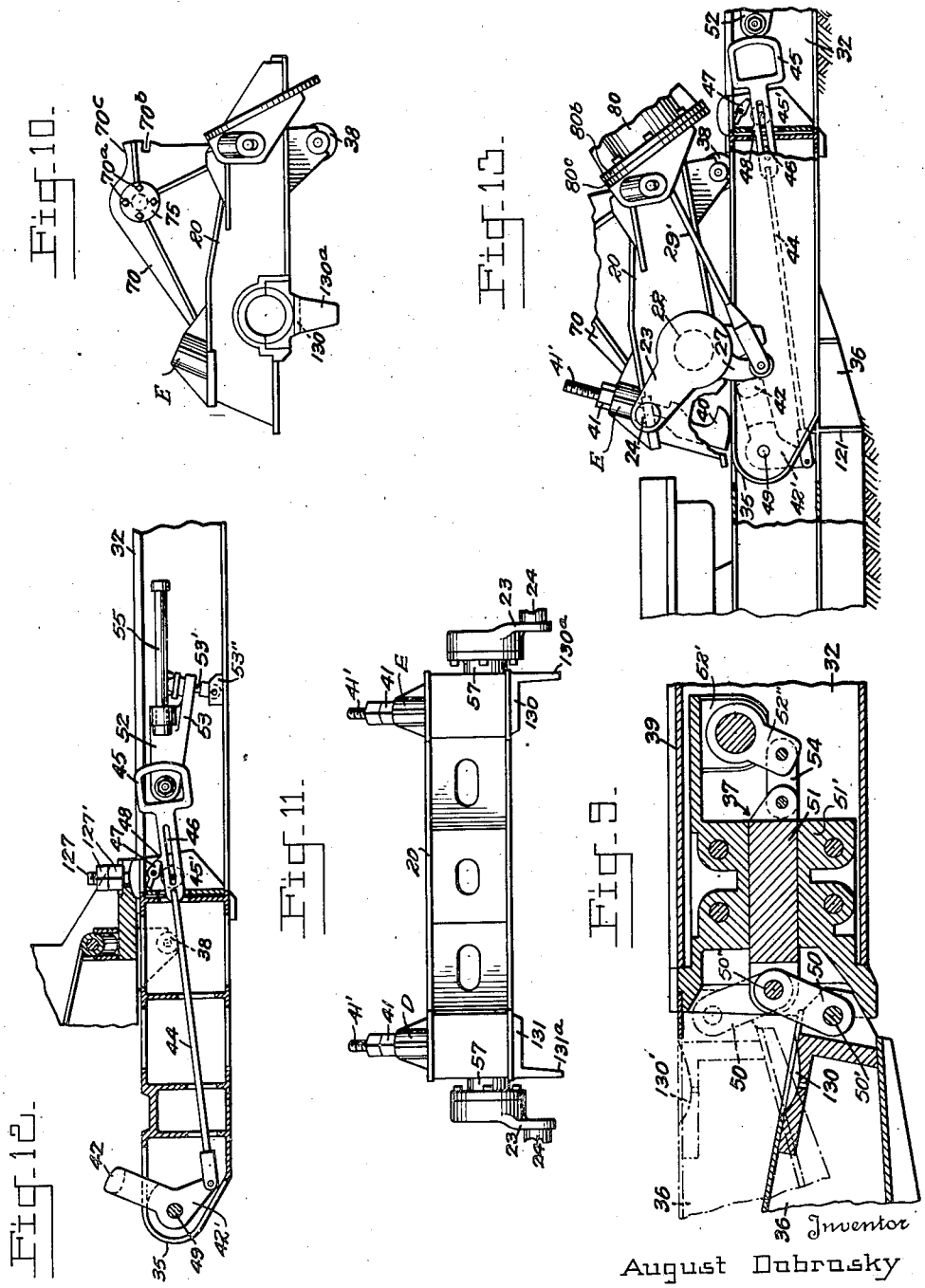
Inventor
August Dabrasky
By Kessenich + Church
Attorneys Patented Mar. 6, 1945

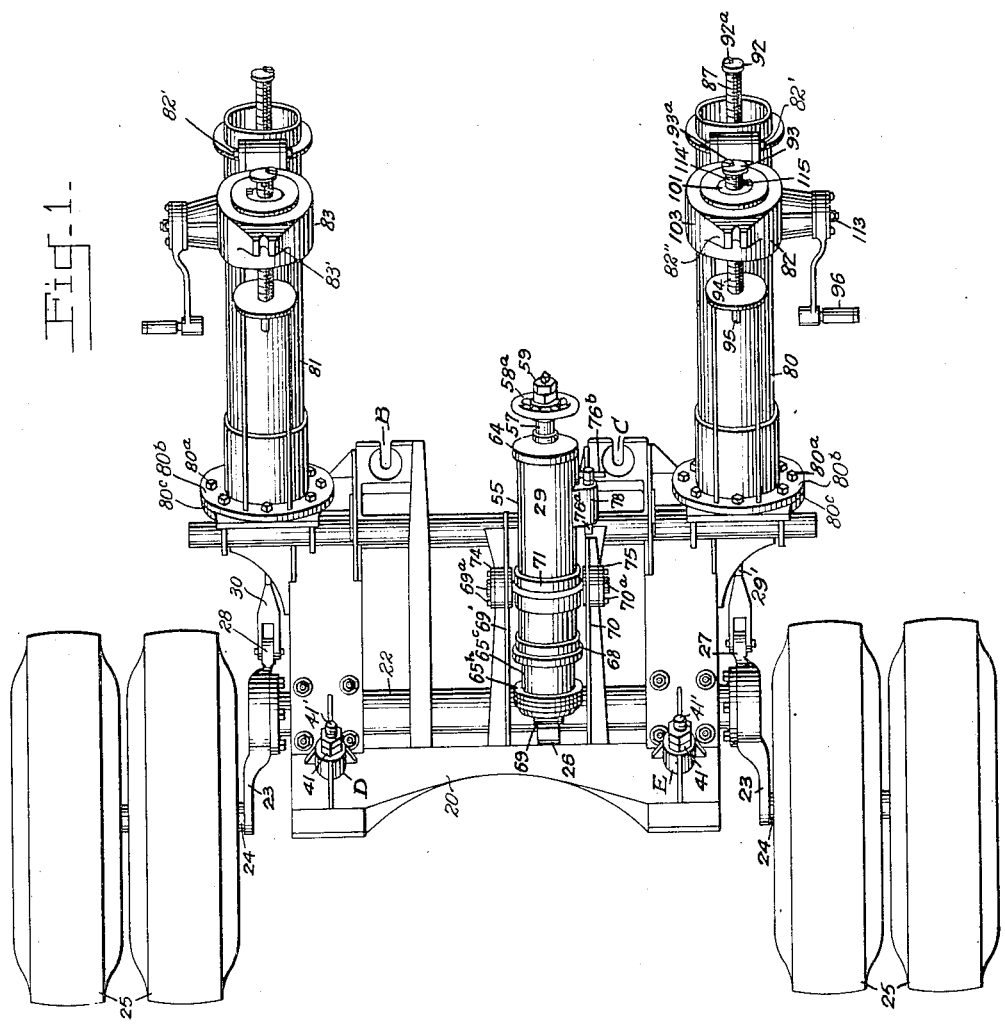

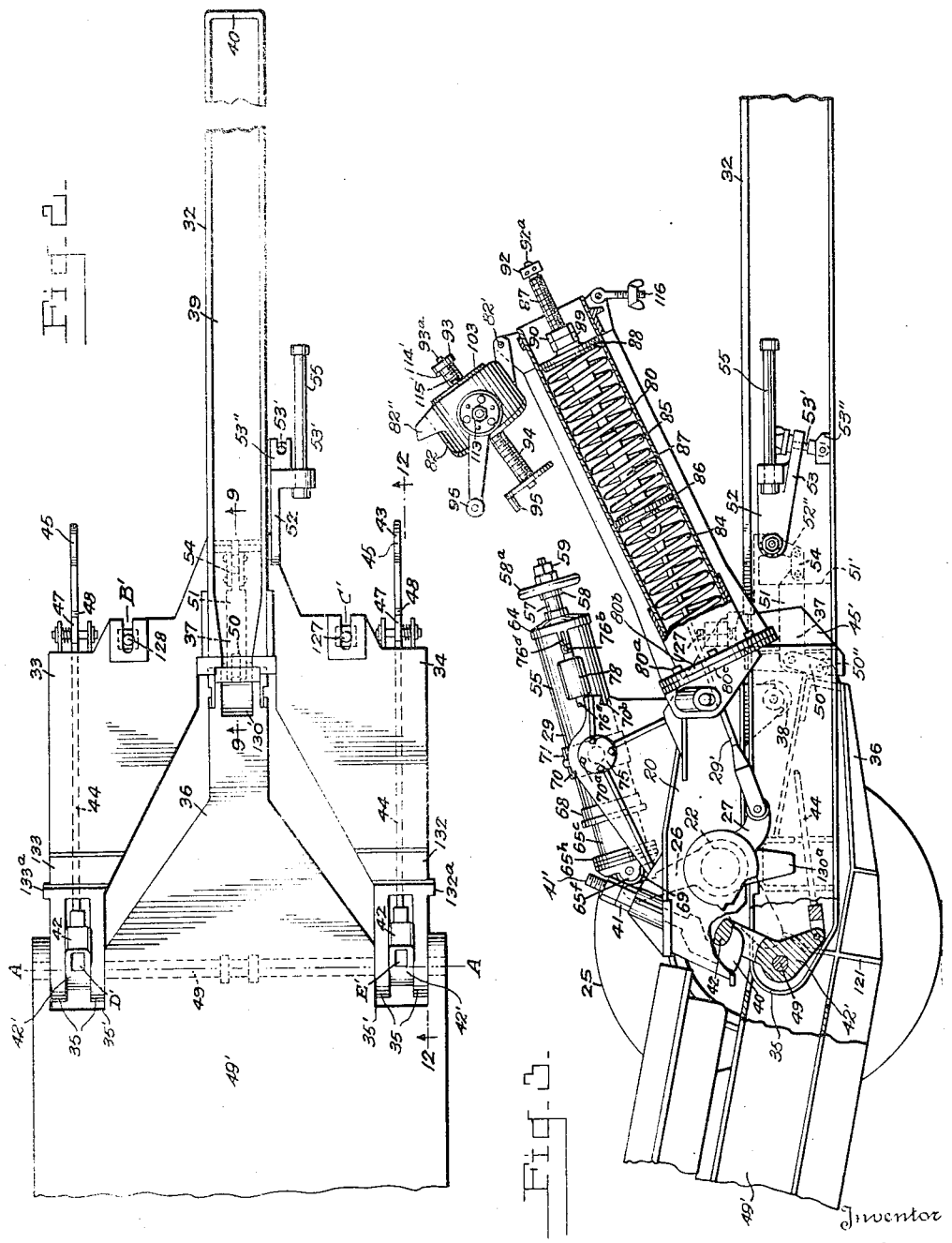

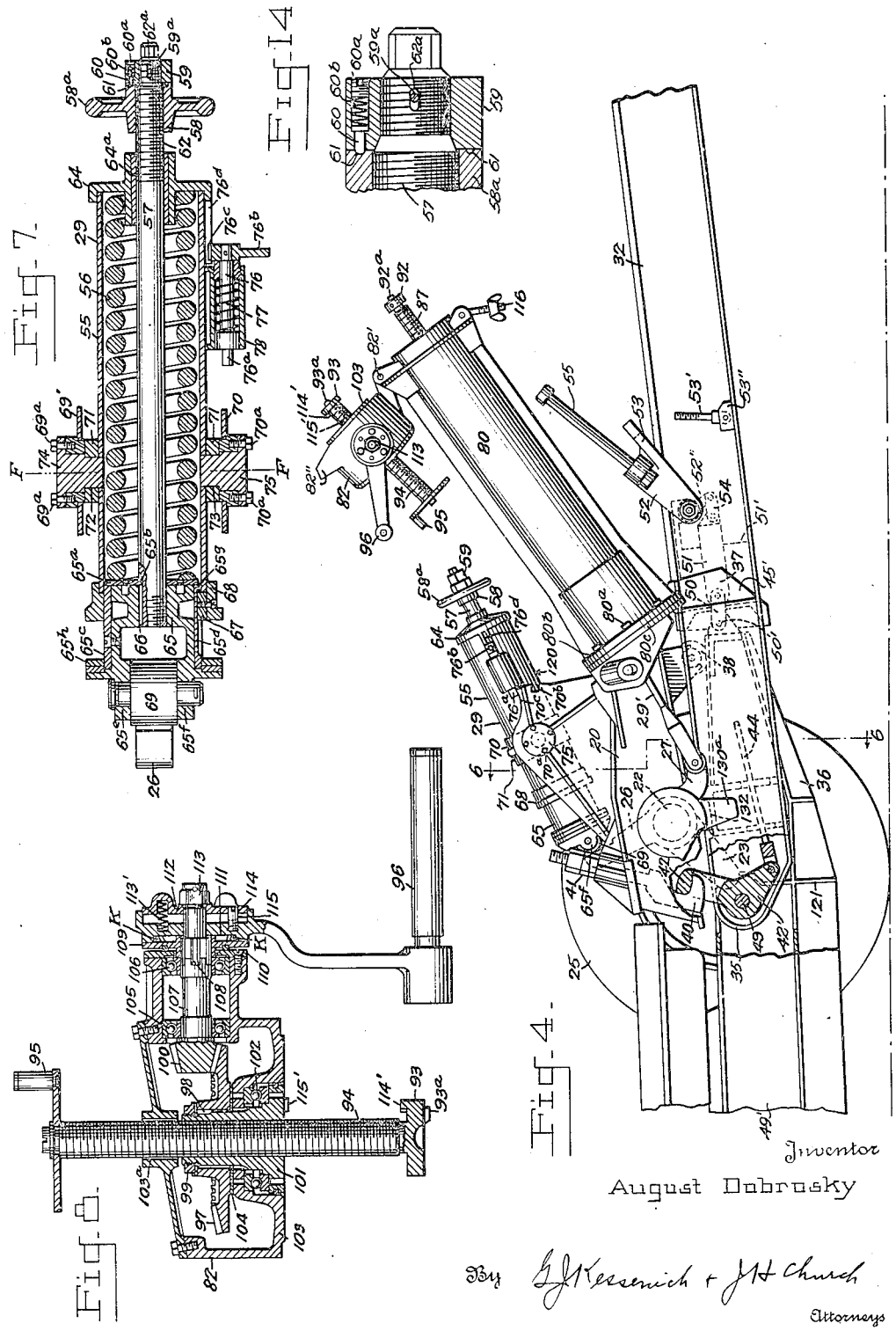

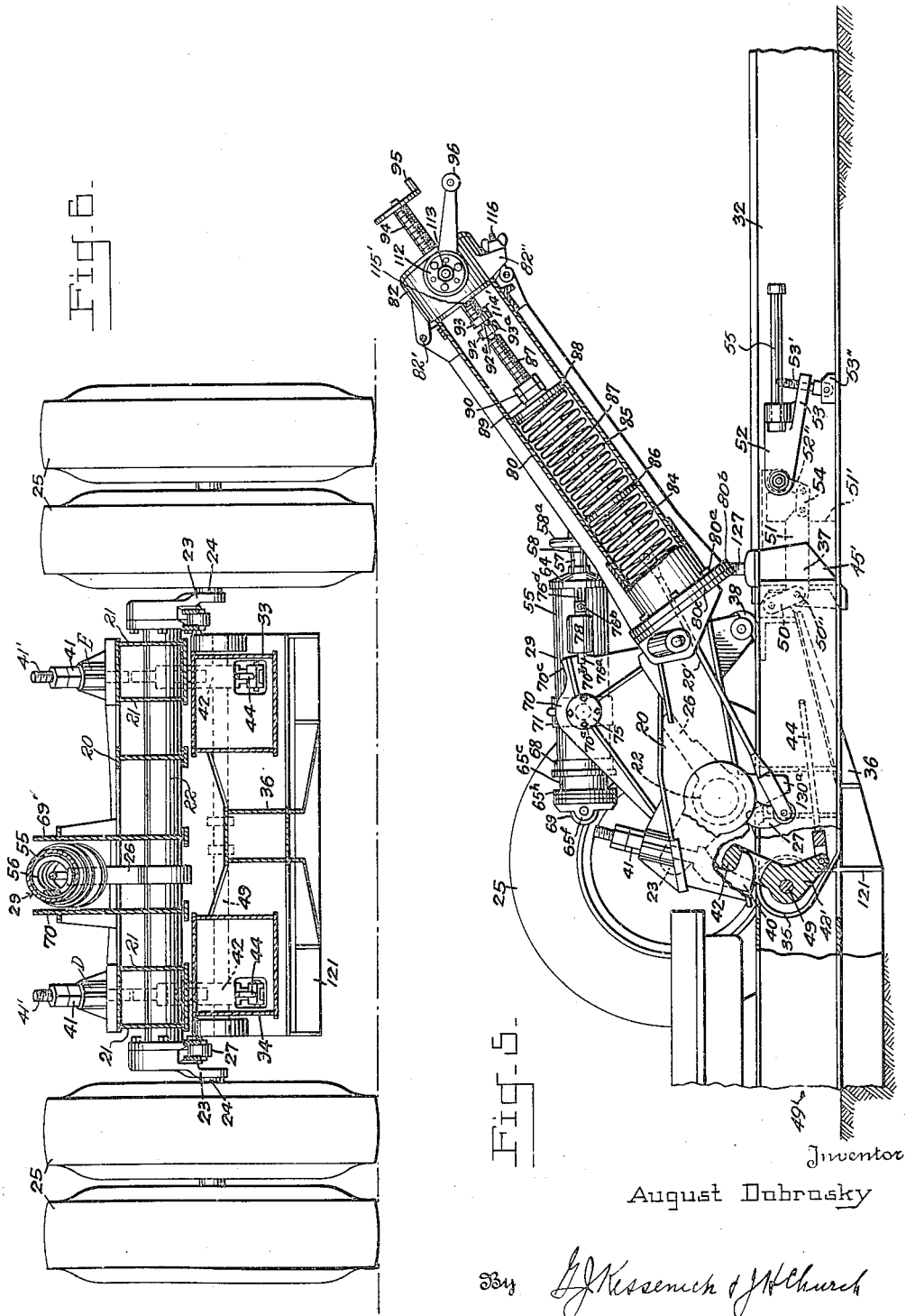

2,370,639

UNITED STATES PATENT OFFICE 2,370,639

VEHICLE

August Dabrasky, Washington, D. C.

Application September 9, 1941, Serial No. 410,180

24 Claims. (Cl. 89—40)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a vehicle or bogie especially adapted for transporting a gun and its mount. It is associated with the trail of the mount and is so constructed and arranged that it can be shifted to the extreme end of the trail where it is out of the way when the mount is in gun-firing position, or removed from the trail entirely and put to one side, provision being made for its convenient and expeditious reestablishment on the trail.

It is to be understood that while the vehicle is especially adapted for use in connection with a gun mount, its use is not so limited.

One of the objects is to provide a vehicle of this kind that will comprise a durable, easily operable mechanism by which the entire mount can be raised for travel and lowered to emplacement position with a minimum of physical effort, and with a minimum number of operations and which will provide a resilient suspension of the mount during the lowering and raising operations, and in transit.

Other advantages of the invention will become obvious to those skilled in this art as the following description proceeds, with special reference to the counterpoise and buffer features and their cooperation in a mechanism for lowering the frame of the bogie with respect to the wheels.

In the drawings,

Fig. 1 is a plan view of the bogie.

Fig. 2 is a plan view of the trail showing its construction adjacent the point of its connection with the gun pedestal extension and some of the means for effecting the connection.

Fig. 3 is a side elevation and partial section of the gun pedestal extension and gun trail mounted on the bogie in traveling condition.

Fig. 4 is a view in side elevation partially in section of the gun pedestal extension and gun trail mounted on the bogie, showing the positions occupied by the parts in a stage preparatory to lowering the mount and trail to gun-firing position, or gun placement.

Fig. 5 is a side elevation partially in section of the pedestal extension and gun trail mounted on the bogie, after the mount and trail are "crushed down" or in that position in which the mount is in gun-firing position.

Fig. 6 is a view in end elevation and partially in section taken about the line 6—6 of Fig. 4.

Fig. 7 is a central section through the center buffer assembly.

Fig. 8 is a central sectional view of one of the wheel raising and lowering devices.

Fig. 9 is an enlarged sectional view taken substantially on line 9—9 of Fig. 2, showing in full lines the relative position of the pedestal extension and the rear end of the trail in traveling condition, and their relative gun-firing position being shown in dotted lines.

Fig. 10 is a side elevation of the bogie frame.

Fig. 11 is an incomplete view of the rear portion of the bogie frame.

Fig. 12 is a longitudinal sectional view through one side of the trail about on the line 12—12 of Fig. 2, and showing a fragment of the bogie frame, an element of the means for locking the frame to the trail when necessary, and other elements instrumental in locking the bogie to the trail and to the extension of the mount pedestal.

Fig. 13 is a view of two devices for fastening the rear portions of the bogie to the rear portion of the trail, the shown fastening devices being in disengaged position.

Fig. 14 is an enlarged sectional view of a stop wheel forming a part of the buffer assembly.

Referring to the drawings, numeral 20 designates a frame upon which is mounted the mechanism of the bogie. The numeral 22 designates an axle rockably mounted in the frame in bearings 21. Fixed to each end of the axle is a crank arm 23 provided with spindles 24 upon which are mounted wheels 25, the spindles serving as axles for the wheels. Fast to the central portion of the axle 22 is a lever 26 and fixed to the opposite ends of the axles are two levers 27 and 28 which are alike. The central lever 26 is arranged to make contact with one end of a buffer assembly designated as a whole by 29, Fig. 7, when the mount is in traveling condition, whereas levers 27 and 28 are pivotally connected with the piston rods 29' and 30 which work in cylinders 80 and 81 of a counterpoise assembly which will be presently more fully described in detail.

The strength of the springs of the counterpoise assemblies, and the strength of the buffer assembly are preferably so ordered that the former will sustain, while the mount is in traveling condition, about 60% and the latter approximately 40% of the weight of the mount and its gun.

The numeral 32 designates the gun trail or tongue, and as best shown in Fig. 2, has a Y-shaped end of very considerable width comprising two identical members 33 and 34 which have extensions 35, which are hinged in recesses 35' on the transverse shaft 49 which has bearings in a part 49' of the pedestal of the mount. The pedestal has an extension 36 which extends between the arms of the Y-shaped member of the trail, Fig. 2, the extension and trail being locked together by a locking means of which the ear 37, Fig. 9, is a part, and which will presently be reached for a more detailed description, which means couples the trail and the pedestal extension when the mount is in traveling condition, and also when the mount is in gun-firing position.

The bogie frame 20, as shown in Fig. 1, is provided with oppositely disposed recesses B and C, and the trail has oppositely disposed recesses B' and C' in its members 33 and 34, Fig. 2, said recesses being adapted to register. Headed bolts 127 and 128, whose shanks carry fastening nuts 127', Fig. 12, extend through the recesses B' and C' in the trail, and through the similar recesses B and C in the bogie frame, and constitute part of the means for locking the frame to the trail under traveling conditions. As further means for locking the trail and frame together, there are oppositely disposed sleeves D and E through which pass the threaded shanks 41' of two identical hooks 40 which are arranged to be simultaneously engaged with and disengaged from the cross-piece 42 of a member 42' rockably mounted on the transverse shaft 49, Fig. 2, mounted in suitable bearings in the pedestal of the mount. Nuts 41 on the shanks 41' of the hooks permit the hooks to be manipulated to engage or to be disengaged from the cross-piece 42 accordingly as to whether the mount is in condition for travel, or in gun-firing position, it being understood that the hooks are in engaging position at the same time that the front of the frame is locked to the trail at the points BC, B'C', or in the position shown in Fig. 3. The rockable members 42' on shaft 49, and their actuating devices are duplicated and the description of one will suffice as a description for both. There is a handle 45, Figs. 12 and 13, to which is attached the rod 44 pivotally connected with the member 42', and a pin mounted in the ear 45' extends through the slot 46 in the handle to guide the same. The handle, and consequently the rod 44, is prevented from moving from the position in which it holds the member 42' engaged with the hook 40, by a catch 47, adapted to engage and be disengaged from a projection 48 on the upper edge of the handle, the arrangement being such that the handle when in the position shown in Fig. 12, holds the member 42' in position to be entered by the hook 40, but when in the position shown in Fig. 13, the catch is released and the handle may be shoved in, and through the rod connection with 42', said member may be moved out of the way of the hook, or to the position shown in dotted lines, Fig. 13. Underneath the frame there is a bracket in which is mounted a roller 38 received in a depression 130' in the pedestal extension 36 when the mount is in traveling condition, which roller facilitates movement of the frame on the trail in the movement of the bogie unit toward or from the load member or, in this case, the gun mount.

*Means for locking the trail to the gun pedestal*

The trail 32, as stated, is mounted on the shaft 49 in the gun pedestal and is always connected with it, but by a coupling that permits a certain relative movement between the trail and extension. For this coupling there is a link 50 pivoted at 50' to the extension 36 of the pedestal and at 50'', to the end of a bar 51, Fig. 9, slidable in either direction in a bore in a stationary member 51' in the trail. When the extension is down, the link occupies the position shown in full lines, and when up, occupies the dotted line position. In order that the extension accomplish these positions relative to the trail, the rocking of the extension on shaft 49 is necessary. As stated, the bar 51 is arranged to slide in either direction in the member 51' in the trail. However, the mere rocking of the trail or extension relative to each other will not be sufficient to enable the extension to be moved from one illustrated position to the other. In practice, the gun operators will rock the trail relative to the pedestal extension, and at the same time rock the extension until the link 50 passes the center of its pivot 50'' on the bar 51, when a little further appropriate manipulation will throw the link up or down accordingly as it is desired to move the extension to raised or lowered position, as the exigencies of the case may require. There is a locking lever 52 pivoted in an ear 52' on the stationary member 51' in the trail, and the pivot of the lever carries an arm 52'', Fig. 9, which is pivoted to a link 54, which in turn is pivoted to the ear 37 of the bar 51. As intimated, the link connection between the trail and the gun pedestal extension 36 is, in a sense, a permanent one in that it connects the two parts together when in gun-firing position and also in traveling condition, and the extension will be held in either relative position to the trail by the locking lever 52, which lever is only unlocked or in the position shown in Fig. 4, during the time the gun mount is being lowered or raised or when the bogie is being shifted to the extreme outer end of the trail, to be gotten out of the way.

The lever 52 has an arm 53, bifurcated for the entry of the shank 53' of a bolt pivoted to a permanent block 53'' on the trail, there being, as shown in Fig. 12, a wing-nut for engaging the upper face of said arm to lock the lever and consequently bar 51 to which the lever is related through the arm 52'' and link 54, Fig. 9. To facilitate the rocking of the lever there may be a handle 55, which in fact forms a part of the lever. It is obvious that when this lever is locked, there is no possibility of a change in the established relative positions of the pedestal and trail, or say from the positions indicated in Fig. 9, without unlocking the lever.

*Center buffer construction*

The center buffer assembly indicated generally by the numeral 29, Fig. 7, comprises a cylinder 55 inclosing the buffer spring 56, and the reciprocable rod 57 which has an adjustable stop 58, which stop is a part of an operating wheel 58a, which is locked on the rod by the lock-nut 59. There is a spring 60b in the nut backing a pin 60, which pin is adapted to enter one or another of a number of circumferentially arranged notches 61 in the outer face of the stop to lock the stop in any adjusted position. A removable plug 60a holds the pin 60 and spring 60b in place. A pin 59a passes through the nut and into a hole 62a in the rod 57 to hold the nut 59 on the rod. The rod 57 slides or reciprocates in the cylinder and the hardened threads 62 on the rod slide in the bearing 64a in the cylinder cap 64, without injury. At the front end of the cylinder there is a movable spring seat comprising a body 65 fixed to a disc 65a against which the spring rests. The disc is provided centrally with a key 65b which runs in a keyway 66 in the end of the rod, this end of the rod being provided with threads co-acting with the threads in the body 65, but there is no relative rotation between said body and rod 57. The body 65 is surrounded by a cylinder 65c which is provided with a groove 65d which receives the key 67 secured to an annulus 68 which surrounds the cylinder 65c and a small part of the end of the cylinder 55 to which the annulus is secured. This key 67 cooperates with the shoulder 65g of the cylinder 65c and prevents the body or spring seat 65 from becoming disengaged from the cylinder 55. The body 65 has an extension having bearing portions 65e and 65f in which is journalled a roller 69 cooperating at times with the lever 26 centrally fixed to the rockable axle 22, Fig. 1.

As the lever 26 oscillates with the axle, the movement of the spring seat 65 will be confined along the axial direction of the spring which is assured by the cooperation with the keys 65b and 67, in the grooves 66 and 65d, respectively, and the rod 57 will reciprocate a distance determined by the distance between the stop 58 on the wheel 58a and the end of the bearing sleeve 64a in the cylinder cap 64, and the extent of movement between the ring 65h on the short cylinder 65c, and the face of the annulus 68 in either direction, is limited by the length of the groove 65d. The forward stop limit may be altered by releasing the lock-nut 59 and rotating the wheel 58a, thus moving the stop 58 relative to the cap 64, and the rear stop limit may be altered by removing or adding washers or rings similar to 65h, and thus increasing or diminishing the distance between the ring 65h and the face of the annulus 68.

The stop 58 functions with its associated elements, to relieve the roller 69 from contact with the lever 26, and to bring about such release, the stop wheel is rotated until it abuts the cylinder cap 64, Fig. 7, and obviously further rotation in the same direction will draw the rod 57 and the member 65 to the right and consequently the roller carried by said member.

Referring particularly to Fig. 1, it will be seen that there are two spaced brackets 69' and 70 on the bogie frame 20. About centrally of the buffer cylinder is secured a band 71, provided with appropriately disposed bearings 72 and 73 for the inner ends of the trunnions 74 and 75, which are fixed to the brackets 69' and 70 by circumferentially disposed screws 69a on one side, and 70a at the other, thus the whole buffer assembly may pivot about an axis designated by F—F, Fig. 7.

There is a cylindrical housing 78 mounted on the side of the cylinder 55, closed at one end by an apertured slidable plug, and at the other by an apertured stationary plug. Extending through the plugs is a pin 76 surrounded by a compression spring 77 arranged to keep a projection 76c of a hand grip 76b, in the rear end of a groove 76d in the side of the cylinder, there being an end 76a of the pin extended beyond the housing. The exposed end of the pin serves as a latch, in that it enters a recess 70b in the bogie frame, Fig. 10, when the mount is in gun-firing position, as shown in Fig. 5, and at other times abuts the top edge 70c of the frame, or when the gun mount is in traveling condition.

*Construction and operation of counterpoise mechanism*

The numerals 80 and 81 designate the counterpoise cylinders which are identical in construction and a description of one will suffice for both. It will be convenient to describe the cylinder 80.

For the cylinders there are control heads 82 and 83 pivoted thereon and operated to rock the axle 22, to raise or lower the wheels 25 with respect to the bogie frame. The cylinder 80 is secured to the bogie frame by bolts 80a passing through the flange 80b of the cylinder into a plate 80c on the frame, Fig. 1. Springs 84 and 85 are contained in the cylinder and separated by a common spring seat 86 movable on shaft 87. This shaft has, adjustable thereon, a spring seat 88, the shaft being threaded for adjustment which may be accomplished through the instrumentality of an adjusting nut 89 held in adjusted position by a lock nut 90. The shaft 87 has a head 92 having a projection 92a thereon, Figs. 1 and 4, adapted to co-act with an integral head 93 on the threaded shaft 94, which has a projection 93a, the projection serving to lock the shafts 87 and 94 together in applying pressure to compress the springs or relax the pressure as requirements may dictate. The shaft 87 does not rotate, but is given a reciprocatory movement by the revolution of the member 101 in the control head 82. The rod 29' is pivotally connected with the lower end of the shaft 87, which rod has pivotal connection with the lever 27 on the bogie axle 22, it being understood that the rod 30 of the opposite counterpoise cylinder attaches to the lever 28 on the opposite end of the axle.

The head 82, Fig. 8, is pivoted to the cylinder at 82' and includes the mechanism by which the springs in the cylinders are compressed or relaxed. It includes the threaded shaft 94 which has threaded engagement with the centrally disposed member 101, which is connected to a bevelled gear 97 by key 98 and locking nut 99. Meshing with the gear is a pinion 100 rigidly connected with a short shaft 107, there being interposed between the operating handle 96 and the pinion, a mechanism that does not allow more than a predetermined amount of torque to be transmitted to the pinion. The shaft 94 is free to move through the hole 103a in a boss centrally located in the removable top plate of the housing 103. A ball bearing 102 is between the housing 103 and the rotatable member 101, and there is a washer 104 between the bevelled gear 97 and the raised central portion of the housing 103. Ball bearings 105 and 106 are disposed between parts of the casing and the pinion shaft 107, which shaft has splines 108 which slide in grooves in the hub of a disc 109 which is spaced from the casing by a second disc 110 securely fastened to the casing. The outer face of the disc 109 has inclined projections that cooperate with similar projections on the inner face of the upper handle portion 111, said projections being located with respect to the disc 109 and portion 111, at the region designated by K. The upper portion 111 of the handle has an annular recess which receives a disc 112 secured to the outer end of the shaft 107 by a nut 113. Interposed between the handle portion and the disc 112 are a number of spiral springs 113' tending to keep the handle portion and the disc 109 in contact, or in the position in which the cooperating projections of the elements are in position to operatively engage. There are a number of guide pins 115 secured in 111 and pass through holes 114 in the disc 112. These pins alternate in position with the springs 113'. The arrangement of the devices just described is such that when excessive power is applied, or power in excess of that necessary to sufficiently compress the spring or springs contained in the cylinder 80, the co-operating projections on the handle portion 111 will pass over those on the disc 109, and in doing so force said handle portion outward on the shaft 107 against resistance of the springs 113'. Continued operation of the handle against abnormal resistance will continue the rapid engagement and slipping disengagement between the projections, without imparting any motion to the gear wheel 97, and consequently no motion to the shaft 94.

A projection 114' on the head 93 of the shaft 94 cooperates with a projection 115' on the member 101 to keep the head from binding against said member when the head is in its uppermost position.

In operation if it is desired to move the shaft 87, Fig. 5, to tension or relax the springs along the axial direction of the cylinder, the control head 82 is swung over the end of the cylinder and locked by a bolt 116, carrying a wing nut seating upon a bifurcated projection 82'' on the head 82, similar to the projection 83' of the control head of the opposite cylinder.

*Operation in emplacement and lifting the mount*

The strength and proportions of the cooperating parts of the organization will, it will be understood, be changed commensurate with the requirements, with special regard to the weight of the mount which ordinarily runs into tons.

In Fig. 3, the parts of the bogie are in the positions for transporting the mount or load member, and enough of the pedestal of the mount is shown to illustrate its tilted position relative to the bogie and to the gun trail. Preparatory to emplacement of the mount, the gun pedestal extension 36, Fig. 3, is rocked to the position shown in Fig. 4. There are three outriggers proper (not shown) pivotally connected with the pedestal of the mount so they can be folded up against the super-structure of the pedestal when the mount is in condition for travel. The gun trail 32 cannot be strictly said to be an outrigger, although at times it serves as such. They extend radially from the pedestal, and one of them will be in line with the trail, and the rocking movement is effected by the weight of a sufficient number of the gun crew standing on the outrigger opposite the trail, the mount pivoting on the wheels 25. This will rock the trail to the position shown in Fig. 4. Some of the men are standing on the outrigger and others are stabilizing the trail. Bolts 127 and 128, Fig. 2, are removed simultaneously or substantially so. Lever 52 which has link connection with bar 51, is unlocked by removing the wing nut from the bolt 53'. This permits bar 51, shown in full lines in Fig. 9, and in dotted lines in Figs. 3–5, to move toward the outer end of the trail and in doing so it will straighten out the link 50, as shown in Fig. 4. Now as the trail is lowered, the end of extension 36 of the pedestal rises to about the position shown in dotted lines in Fig. 9, wherein the extension and trail are in line. During the change from the positions of Fig. 4 to Fig. 5, the lever 52 is necessarily lowered. When the trail is brought to the same level as the extension, the structure is still supported above the ground by the wheels. To rock the buffer cylinder on its trunnions, the wheel 58a is operated to draw the spring seat 85 into the cylinder 86 a certain distance, the roller remaining in contact with the lever 26, thus transferring a part of the load from the buffer spring to the counterpoise spring. The buffer cylinder may now be manually rocked to release the lever 26 and thereby transfer the entire load to the counterpoise spring. Obviously, when the lever 26 is released, the axle is permitted to rock, and in doing so simultaneously rocks the levers 27 and 28 about the axle 22. Upon downward movement of the lever 26, and levers 27 and 28, tension is put upon the counterpoise springs through the rods 29', drawing the rods 87 some little distance into the cylinders. At this stage the mount and trail are on the ground, but may be not sufficiently so to permit the spades to sink in the desired distance. Now the operating heads 82 and 83 are rocked into place on the counterpoise cylinders, bringing the ends of the rods 87 and 94 in contact at which time the heads are locked and the handles 96 cranked clockwise further compressing the springs to lift the wheels off the ground. Now an appropriate member of the gun crew will stand on the trail 32, now acting as a quasi outrigger, and the other outriggers, which will force the spades into the ground. The operation to "bogie" up is in order to return the wheels to the ground, and when they are returned the nuts 41, Figs. 1 to 5, are loosened to lower hook 40 from contact with the parts 42 of pivoted members 42', when, through rods 44, Figs. 12 and 13, said members will be rocked upon manipulation of the handles 45 and may be swung down to position shown in dotted lines in Fig. 13.

The bogie can now be run to the end of the trail where it will be out of the way, the roller 38 riding out of the depression 130 in the extension 36 of the pedestal into the guideways 39 in the trail.

It will be noted that the handles 45 are held latched by latches 47 engaging projections 48 on the handles when the member 42 is in engagement with the hook 40.

In order that the frame 20 and the parts carried thereby be moved with precision relative to the trail platform in mounting and locking the frame on the platform, the underneath part of the frame is provided with spaced members 130 and 131, Fig. 11, having vertical extensions 130a and 131a for engagement with the short laterally extending stops 132a and 133a on the platform adjacent the slight depressions 132 and 133, in which the horizontal parts of 130 and 131 seat, the extensions cooperating with the sides of the platform to guide the frame to its final rearward position when the locking devices carried by the frame and those carried by the trail will be properly positioned relative to each other, and to guide the frame toward the end of the trail when such movement of the frame becomes expedient.

I claim:

1. In a vehicle, a frame, a supporting unit for the frame including a crank rotatably mounted on the frame and having a raised and a lowered position with respect to the frame, two levers on the crank and having an included angle of substantially 180° when projected on a plane perpendicular to the crank rotation axis, a balancing spring, a housing for the balancing spring, means for rigidly connecting the housing to the frame, a link pivotally mounted on the free end of one lever and to the frame through the spring, and a quick removable connection between the other lever and the frame comprising a buffer spring and associated housing which is trunnioned in the vehicle frame.

2. In a vehicle, a vehicle frame, a supporting unit for the frame including a crank rotatably mounted on the frame and having a raised and a lowered position with respect to the frame, a second frame adapted to be carried by the vehicle frame, resilient balancing means between the vehicle frame and the crank, a housing for the balancing means, means for rigidly fastening the housing to the vehicle frame, means for varying the position of the balancing means, a quick removable connection between the two frames, and means for retaining the vehicle frame in alignment with the second frame when the two frames are disconnected.

3. The same as in claim 2 and the last recited means comprises members carried by the vehicle frame embracing the sides of the second frame and a channel on the second frame, and a caster on the vehicle frame engaging the channel in the second frame.

4. In a vehicle, a vehicle frame, a supporting unit for the frame including a crank rotatably mounted on the frame and having a raised and a lowered position with respect to the frame, a second frame adapted to be carried by the vehicle frame, a quick removable connection between the two frames, and means for retaining the vehicle frame in alignment with the second frame when the two frames are disconnected.

5. In a vehicle having one of its wheels mounted on a crank and having a vertically movable frame, a coil spring, a spring pressure plate having an aperture, a housing for the spring, means for fixing the housing on the frame, a rod passing along the coil axis and extending through the pressure plate aperture, means for fastening the rod to the pressure plate, a lever on the crank and pivotally mounted to one end of the rod, and means for engaging the other end of the rod and moving it along its axial direction.

6. In a vehicle having one of its wheels mounted on a crank and having a vertically movable frame, a spring, a spring housing on the frame, a spring pressure plate in said housing, a rod, means for attaching the rod to the pressure plate, a lever on the crank and pivotally mounted to the rod, a second rod adapted to be aligned with the above rod, means for attaching the second rod to the housing, and means for moving the second rod along its axial direction.

7. In a vehicle having one of its wheels mounted on a crank and having a vertically movable frame, a spring on the frame, a spring pressure plate, a rod, means for attaching the rod to the pressure plate, a lever on the crank and pivotally mounted to the rod, means for moving the rod along its axial direction, and safety means allowing operation of the last mentioned means when the force applied to the rod is below a predetermined maximum amount.

8. In a vehicle having one of its wheels mounted on a crank and having a vertically movable frame, a spring on the frame, a spring pressure plate, a rod, means for attaching the rod to the pressure plate, a lever on the crank and pivotally mounted to the rod, a second rod adapted to be aligned with the first rod, means for joining adjacent ends of the rods, means for moving the second rod into joined relation with the first rod, and means for imparting a thrust to the second rod.

9. In a vehicle having one of its wheels mounted on a crank and having a vertically movable frame, a spring, a spring housing on the frame, a spring pressure plate, a rod, means for attaching the rod to the pressure plate, a lever on the crank and pivotally mounted to the rod, a second rod having screw threads and adapted to be aligned with the first rod, a supporting member for the second rod adapted to be mounted on the spring housing, means for joining adjacent ends of the rods, a gear rotatably mounted in the supporting member and having an axially disposed threaded portion which cooperates with the screw threads on the bolt, means for rotating the second bolt, and means for rotating the gear.

10. The same as in claim 9 and safety means for allowing rotation of the gear only when the force transmitted to the gear is below a predetermined maximum value.

11. In a vehicle of the character described, in combination with a load member, a trail for said member, pivotal draft means for connecting the trail to the load member, a frame detachably mounted on the trail, means for locking the frame to the trail for joint up and down movement, additional means connecting the trail and load member and operating to lock said member in angular relation to the trail, an axle rockably mounted on the frame, spindles carried by the axle and axially offset therefrom, wheels on said spindles, a lever fixed to the axle, a counterpoise spring mounted on the frame, connections between said lever and spring whereby when the spring is compressed, the axle will be rocked to lower the load relative to the wheel spindles, and manually operable means for compressing the spring to further lower the load.

12. In a vehicle of the character described, in combination with a load member, a trail for said member, pivotal draft means for connecting the trail with the load member, a frame detachably mounted on the trail, means for locking the frame to the trail for joint up and down movement, an axle rockably mounted on the frame, spindles fixed to the axle and axially offset therefrom, wheels on said spindles, means connecting the trail and load member, and operating to lock said member to the trail in angular relation thereto upon the rocking of the load member upon the wheels, a lever fixed to the axle, a cylinder mounted on the frame and containing a counterpoise spring, connection between said lever and spring whereby when the spring is compressed, the axle will be rocked to lower the load with respect to the wheel spindles, and manually operable means carried by the cylinder for compressing the spring.

13. In a vehicle of the character described, in combination with a load member, a trail for said member, pivotal draft connections for connecting the trail to the load member, a frame detachably mounted on the trail, means for locking the frame and trail for joint up and down movement, an axle rockably mounted on the frame, spindles fixed to said axle and axially offset therefrom, wheels on said spindles, additional means connecting the trail and load member comprising a bar slidably mounted in the trail, a link pivoted to the load member at one end and to the bar at the other, said link operating to lock the load member in angular relation to the trail when the vehicle is in traveling condition, means for locking the bar to hold the link in either upraised or depressed position, a lever fixed to the axle, a spring mounted on the frame, a rod connecting said spring and lever, and manually operable means for compressing the spring whereby through the rod and lever connection the load is lowered with respect to the wheel spindles to lower the load.

14. In a vehicle of the character described, in combination with a load member, a trail for said member, means for connecting the trail to the load member, a frame detachably mounted on the trail, an axle rockably mounted in the frame, a lever on the axle, spindles carried by said axle and axially offset therefrom, wheels on said spindles, a cylinder mounted on the frame and containing a counterpoise spring, a spring seat movable in the cylinder, a shaft extending through said spring and seat and moving therewith, a rod connecting the shaft and lever whereby, when the spring is compressed, the axle will be rocked to lower the load with respect to the wheel spindles, a control mechanism mounted on the cylinder and including a shaft positioned to engage the shaft in the cylinder, manually operable means for feeding the control mechanism shaft to cause the seat to compress the spring, and means for locking the frame to the trail.

15. The invention of claim 14 characterized in that the means for locking the frame to the trail comprises a slidable hook carried by the frame and a rockable member carried by the trail and having a portion arranged to be engaged with and disengaged from the hook, manually and operable means for rocking said member out of position to be engaged by the hook in the lowermost position of the load member and trail.

16. In a vehicle of the character described, in combination with the pedestal of a gun mount, a transverse shaft journalled in said pedestal, a gun trail pivotally mounted on said shaft, a frame mounted on the trail, an axle rockably mounted in said frame, spindles fixed to the ends of the axle and axially offset therefrom, wheels on the spindles, levers fixed to the axle adjacent the ends thereof, and a buffer lever fixed to said axle intermediate its ends, oppositely disposed cylinders mounted on the frame, a reciprocable shaft in each cylinder, spring seats on the shafts and arranged to move therewith, counterpoise springs in the cylinders and seating on the seats, connections between the shafts and the levers on the axle whereby when the springs are compressed, the axle will be rocked with respect to the wheel spindles to lower the load, and manually operable means mounted on the cylinder for reciprocating the shaft of the counterpoise spring, and a buffer means carried by the frame intermediate the cylinders and comprising a spring backed element for engagement with the buffer lever on the axle to yieldingly resist rocking of the axle when the vehicle is in traveling condition, and manually operable means for disengaging said spring-backed element from said buffer lever to permit the axle to be rotated.

17. In a vehicle of the character described, in combination with the pedestal of a gun mount, a transverse shaft journalled in said pedestal, a gun trail comprising a platform formed with extensions pivotally connected with said shaft, an extension on the pedestal in line with the trail, a slidable bar carried by the trail and a link pivotally connecting said bar and pedestal, said link functioning to hold the pedestal extension in either raised or lowered position relative to the trail, means on the trail for locking the bar and consequently the link in raised or lowered position, a vertical frame on the trail having a rockable axle journalled therein and carrying wheel spindles fixed thereto and axially offset therefrom, wheels on said spindles, oppositely disposed levers on the axle, oppositely disposed cylinders secured to the said frame and containing counterpoise springs, connections between the axle levers and springs whereby when the springs are compressed, the load will be lowered relative to the wheel spindles, manually operable means carried by the cylinder for compressing the springs, said means also operable to permit said springs to relax, locking members pivotally mounted on the transverse pedestal shaft, adjustable hooks on the vehicle frame for engaging said locking members and forming, with said members, a part of the means for locking the vehicle frame to the trail, and additional means for locking the vehicle frame to the trail.

18. In a vehicle of the character described, in combination with a pedestal of a gun mount, a gun trail pivotally connected with said pedestal, a frame mounted on the trail, an axle rockably mounted on the frame and having fixed thereto axially offset spindles, wheels on said spindles, levers fixed to the axle and normal thereto, counterpoise springs carried by the frame, connections between the springs and said levers whereby a portion of the weight of the load is sustained by the springs when the mount is in non-emplacement position, an additional lever fixed to the axle, buffer means carried by the frame and comprising a spring, a movable member backed by said spring in engagement with the additional lever whereby the load is sustained in common by the counterpoise and buffer springs when the mount is in traveling condition, and manually operable means for moving said movable member into and out of engagement with said additional lever.

19. The invention of claim 18 characterized in that the spring backed movable member for engaging the additional lever comprises a roller and manually operable means for moving the roller comprising a reciprocable threaded rod extending through the buffer spring and carrying a threaded wheel co-acting with a stationary abutment and with the threads on the rod to non-rotatably reciprocate the rod, and thereby move the roller into and out of engagement with the additional lever according to the direction in which said wheel is rotated.

20. In a vehicle for transporting, lowering, and raising a load member, a trail rockably connected with the load member and provided with a platform, a supporting unit mounted on the platform comprising a frame, an axle rockably mounted on the frame and having crank arms fixed thereto, spindles parallel to the axle and fixed to the crank arms, wheels on the spindles, means for raising and lowering the load relative to the wheel spindles comprising a lever fixed to the axle and extending at a substantial angle to the crank arms, a housing fixed to the frame, a counterpoise spring in said housing, connections between the counterpoise spring and the lever whereby when the axle is rocked relative to the wheel spindles the spring will be compressed to lower the load, said spring acting upon expansion through the lever and said connections to resiliently support a part of the load, a second lever fast to the axle, a second housing mounted on the frame and containing a buffer spring normally supporting another part of the load, means under the influence of the buffer spring for engaging the second lever to prevent the rotation of the axle, manually operable means for disengaging said engaging means to permit rotation of the axle thereby shifting the entire load to the counterpoise spring causing compression of said counterpoise spring and the consequent lowering of the axle relative to the wheel spindles, and the consequent lowering of the load, and manually operable means for further compressing the counterpoise spring to further lower the load with respect to said spindles, and to still further compress the counterpoise spring to raise the wheels off the ground when the load is sustained by the ground.

21. The invention of claim 14 characterized in that the manually operable means for feeding the control mechanism shaft comprises a housing mounted on the counterpoise spring cylinder, an internally threaded member rotatably supported in the housing, a threaded shaft extending through said member and through the housing and adjustable relative to said member, a gear wheel keyed to said member, a divided shaft rotatably mounted in the housing and having a pinion in engagement with the gear wheel, a crank on the end of the shaft outside the housing, there being a slip clutch means between the shaft and crank whereby the crank end of the shaft may slip relative to the pinion end, when excess power is applied to the crank.

22. In a vehicle, a frame, a supporting unit for the frame and having a raised and lowered position with respect to the frame and including an axle rotatably mounted on the frame, cranks on said axle having wheel spindles thereon offset from said axle, wheels on the spindles, a lever fixed on the axle and having a free end, a spring mounted on the frame and fixed with relation to the frame, a link pivoted at a fixed point to the free end of the lever and so connected with the spring that the spring will be compressed upon the lowering of the frame, and manually operable means for further compressing the spring to further lower the frame with respect to the wheels, and to still further compress the spring to raise the wheels off the ground when the frame has reached its lowermost position.

23. In a vehicle of the character described, in combination, a load member, means for coupling the load member and frame, a supporting unit for the frame comprising an axle having cranks thereon having wheel spindles offset from the axle, a spring on said frame and fixed relative thereto, a lever on the axle and having a free end, a link pivotally connected to the free end of the lever at a fixed pivotal point and so connected with the spring that said spring will be compressed upon the lowering of the load member, a buffer lever on the axle, buffer means on the frame comprising a spring-backed element for engagement with the buffer element to yieldingly resist the rocking of the axle and aid in supporting the load when the vehicle is in traveling condition, and means carried by the frame and operable to further compress the first mentioned spring to further lower the load with respect to the wheel spindles.

24. In a bogie for a gun mount, a load member, a frame, means for detachably connecting the frame to the load member, a supporting unit for the frame having a raised and lowered position relative to the frame, said unit comprising an axle rotatably mounted on the frame, cranks on the axle having wheel spindles thereon offset from the axle, wheels on the spindles, a lever fixed to the axle, a counterpoise spring on the frame in fixed relation thereto, connections between said spring and lever whereby the spring supports part of the load when the bogie is in traveling condition, a buffer lever fixed to the axle, buffer means on the frame comprising a spring-backed element for engagement with the buffer lever to yieldingly resist the rocking of the axle and aid in supporting the load when the bogie is in traveling condition, and manually operable means for quickly breaking said engagement to transfer the entire load to the counterpoise spring preparatory to emplacement of the mount.

AUGUST DABRASKY.